United States Patent [19]

Rush et al.

[11] 3,819,855

[45] June 25, 1974

[54] VIDEO CAMERA AND RECEIVER SYSTEM FOR PRODUCING ENLARGED IMAGES OF WORK

[75] Inventors: Michael M. Rush, Van Nuys; John E. Subers, Jr., Hawthorne; Peter C. Herring, Rosemead, all of Calif.

[73] Assignee: Expert Precision Electronic Research Technicians Incorporated, Van Nuys, Calif.

[22] Filed: Dec. 26, 1972

[21] Appl. No.: 318,187

[52] U.S. Cl. ........... 178/7.81, 178/7.9, 178/DIG. 30

[51] Int. Cl. ........................ H04n 5/655, H04n 7/18

[58] Field of Search ............ 178/6.8, 7.81, 7.9, 7.1, 178/DIG. 1, DIG. 30, 7.89; 179/2 TV

[56] References Cited

UNITED STATES PATENTS

| | | | |
|---|---|---|---|
| 2,236,578 | 4/1941 | Parker | 178/7.81 |
| 2,713,609 | 7/1955 | Niklason | 178/6 |
| 2,796,801 | 6/1957 | Simjian | 178/DIG. 30 |
| 3,072,738 | 1/1963 | Epps | 178/7.9 |
| 3,352,966 | 11/1967 | Sawazaki | 179/2 TV |
| 3,461,228 | 8/1969 | Bookman | 178/7.1 |
| 3,559,552 | 2/1971 | Weitzer | 178/7.1 |
| 3,755,623 | 8/1973 | Cassagne | 178/7.89 |
| 3,757,042 | 9/1973 | Funk | 178/DIG. 1 |

*Primary Examiner*—Howard W. Britton
*Attorney, Agent, or Firm*—William W. Haefliger

[57] ABSTRACT

Apparatus for displaying a magnified image of an object comprises:

a. a video receiver, b. a video camera having a lens barrel; the camera electrically connected with the receiver so that the receiver screen displays a magnified image of said object toward which the camera is directed below the level of the camera, c. first means carried by the receiver and supporting the camera for movement relative thereto at one side thereof, and d. second means supporting the receiver spaced above the object level, said second means connected with the receiver and being everywhere spaced outside of an object zone below lens barrel level.

9 Claims, 8 Drawing Figures

VIDEO CAMERA AND RECEIVER SYSTEM FOR PRODUCING ENLARGED IMAGES OF WORK

BACKGROUND OF THE INVENTION

This invention relates generally to reading and writing aids, and more particularly concerns apparatus for displaying an easily readable magnified image of an object, stationary or movable.

There is a need for simple reliable apparatus for displaying enlarged images of objects or subject matter which may be very difficult to visually discern. For example partially blind persons have a need for visual aids which will not strain their sight yet enable them to read books and other writings; and, workers handling or assembling tiny intricate electronic components and circuits also need such aids. Magnifying lenses have been used for these purposes, but they produce eyestrain and are objectionable for other handling reasons. Alternative devices are clumsy, lack portability and are objectionably complex. To our knowledge, no known apparatus provides the unusually advantageous features of construction, modes of operation and results as are now afforded by the present invention.

SUMMARY OF THE INVENTION

It is a major object of the invention to provide portable, compact and simple apparatus overcoming the above referenced disadvantages. Basically, the invention is embodied in apparatus that comprises a video receiver; a video camera electrically connected with the receiver so that the screen of the latter displays a magnified image of an object toward which the camera is directed below the level of the camera; first means carried by the receiver and supporting the camera for movement at one side of the receiver; and second means supporting the receiver spaced above the object level, said support means everywhere spaced outside of an object zone below the camera lens barrel. Accordingly, the entire apparatus may be moved about as a unit, and lateral movement of the object such as a book, for scanning of sentences on the receiver screen, is not obstructed by the support means within the scanning area.

As will be seen, the support means may include vertical and horizontal leg stretches, the horizontal legs for example removably received in tubular sockets attached to the underside of the receiver; an adapter package between the camera and side of the receiver may accommodate pivoting of the camera in a vertical plane and within a wide range; the camera may also be raised and lowered as by structure carried by the adapter package; a light source and/or a slide projector may be carried to tilt with the camera for directing light or illuminated images at a screen in the field of view of the camera; and the entire apparatus may be raised, lowered or moved about as a unit.

These and other objects and advantages of the inventions, as well as the details of an illustrative embodiment, will be more fully understood from the following description and drawings, in which:

DRAWING DESCRIPTION

DETAILED DESCRIPTION

Figures 1, 6, 7, 8:
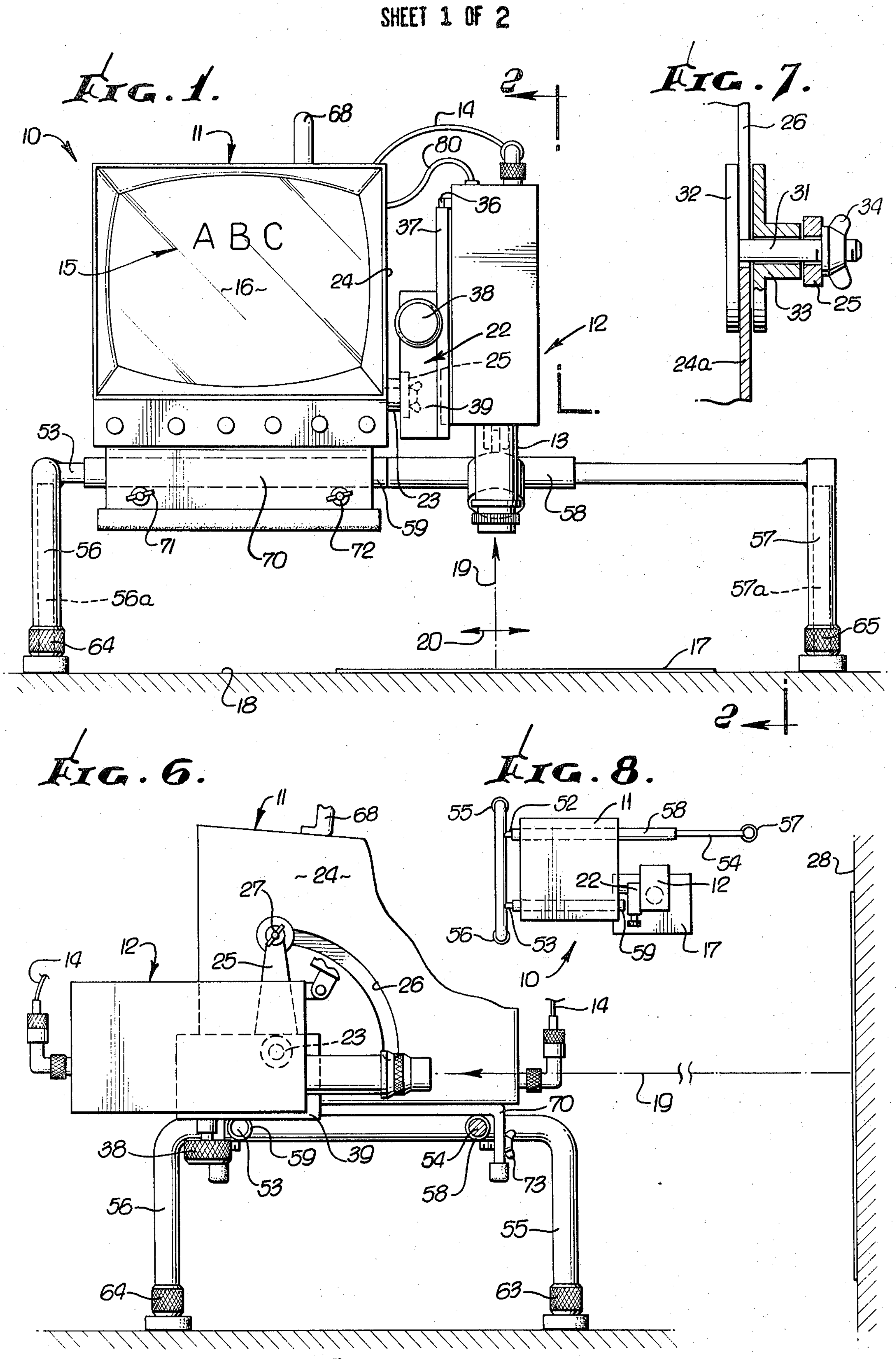
FIG. 1 is a frontal elevation.
FIG. 6 is a view like FIG. 2 showing the camera in another pivoted position.
FIG. 7 is an enlarged view on lines 7—7 of FIG. 2.
FIG. 8 is a plan view of the FIG. 1 combination.

In the drawings, apparatus for displaying, a magnified image of an object or objects is indicated generally at 10, and includes a video receiver 11, and a video camera 12 having a lens housing or barrel 13. The camera is electrically connected at 14 (as for example by a coaxial cable) with the receiver so that the receiver displays a magnified image (as at 15) on screen 16 of the object toward which the camera is directed generally below camera level. For example, an object such as a book 17 may be located on the support surface on table 18, and light reflected at 19 from printing is received by the camera for producing the enlarged image 15. The object may be moved laterally as indicated by arrows 20 to cause a succession of enlarged images to appear at 15, for viewing by a partially blind person. Another application of the invention is the display on the screen 16 of very small and intricate circuitry located at the object zone represented at 17.

In accordance with an important aspect of the invention, first means is carried by the receiver for supporting the camera for movement relative thereto at one side of the receiver. For example, such first means may include an adapter package 22 carried at the side of the receiver and connected with the camera. The package may include a generally horizontal pivot 23 projecting at the side 24 of the receiver, and about which the camera is adjustably swingable. For example, an arm 25 may project from the adapter package, as better seen in FIG. 2, for swinging therewith parallel to the side 24 of the receiver, there being a curved slot 26 at that side to receive a connection 27. The latter is shown as tightenable to fix the arm in any position within a range defined by the FIG. 2 upright position of the camera and the FIG. 6 horizontal position of the camera.

Figures 2, 3, 4, 5:
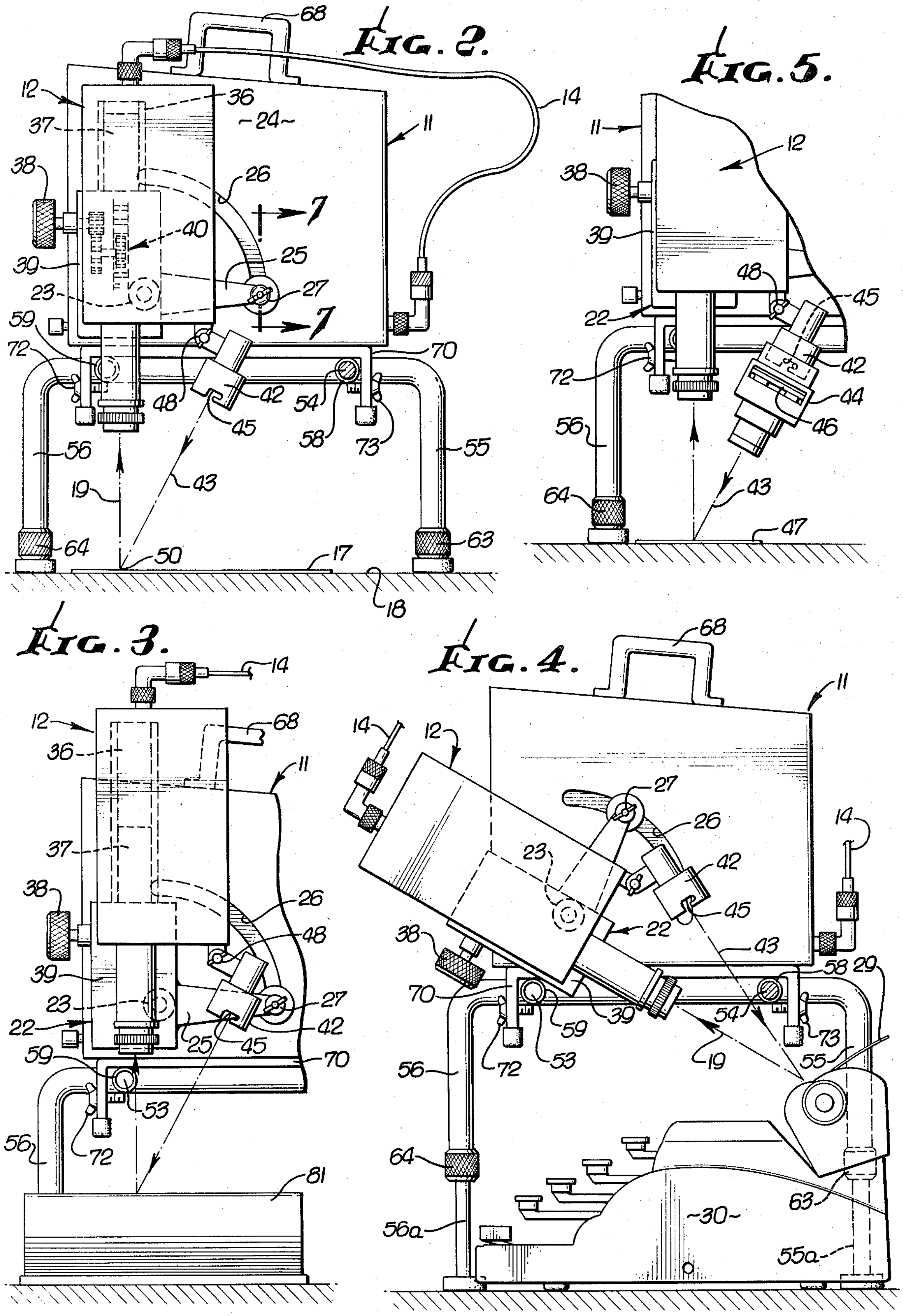
FIG. 2 is an end elevation on lines 2—2 of FIG. 1.
FIG. 3 is a fragmentary view showing a portion of FIG. 2, with the camera in elevated position.
FIG. 4 is a view like FIG. 2 showing the camera in one pivoted position.
FIG. 5 is a fragmentary view showing a portion of FIG. 2, with an auxiliary attachment.

In the former position the camera is aimed at the object 17 as previously described, whereas in the latter position, the camera is directed at an object surface 28 such as an upright blackboard, etc. FIG. 4 shows the camera tilted at an intermediate position, and directed at an object such as a sheet 29 of paper in the carriage of a typewriter 30. The connection may, as seen in FIG. 7, include a threaded shaft 31 projecting through slot 26 and carrying a flange 32 at the inner side of the receiver side wall **24*a*, a spacer 33 in the shaft at the outer side of that wall, and a nut 34 tightenable on the shaft to clamp the arm 25 to the spacer and the latter to the wall 24*a***. Such structure is merely illustrative.

The adapter package may also include adjustable structure for raising and lowering the camera relative to the object zone, as previously referred to, adjust the enlargement or magnification as viewed on the receiver screen. Such structure may include tongue and groove guide elements 36 and 37 on the camera and package, an adjusting knob 38 carried by a package housing 39, and means 40 such as a suitable rack and gear train, or pulley arrangement, to elevate and lower the camera relative to the package 22. This is especially useful where a larger object such as a thick book 81 is placed in the object position, as in FIG. 3 showing the camera elevated.

FIG. 2 shows the provision of a light source 42 carried to tilt with the camera and oriented to direct a light beam 43 toward the object 17, for illumination. Such a source may for example be carried by the case of the camera 12, as shown, to pivot with the latter. In FIG. 4 the light source illuminates the paper 29 in the typewriter carriage. In FIG. 5 a slide projector 44 has been attached to the source 42, as via the J-slot connection 45, for projecting illuminated images of photographic slides 46 toward the object 47 in the form of a screen, for viewing by camera 12. An adjustable connection 48 between the light source and camera 12 allows relative tilting of the source so as to direct the beam 43 toward the point 50 where path 19 intersects the surface of the object 17, or 29 or 47, for various spacings of the camera from that object. The source may be electrically energized by means of an electrical lead 80 connected between a terminal at the receiver and the source. If desired, the camera may have a zoom lens construction.

A further aspect of the invention concerns the provision of second means for supporting the receiver spaced above the object level, and being everywhere spaced outside of an object zone below camera lens barrel level. As a result, the object such as a book 17, or other object, as in FIG. 1 may be moved about to vary the enlarged image 15 on the screen, as during reading of lines on a page, without interference with the support means. The latter may, with unusual advantage include tubular legs having generally horizontal stretches 52–54 and generally vertical stretches 55–57, as better seen in FIGS. 1 and 8. In addition, tubular sockets 58, 59 may be carried by and at the underside of the receiver for slidably receiving the horizontal stretches, as by telescopic interfit. This allows rapid removal of the legs from the sockets, for convenience of transportation of the overall unit.

It will be noted, in FIG. 8, that object 17 such as a book may be widely moved about without interference with vertical stretches 55–57. The latter may also have vertically extensible sections **55*a*–57*a*, with tightening nuts as at 63–65, for raising and lowering the receiver. For this purpose, the receiver may be easily lifted as by a handle 68 to allow extension of sections 55*a*–57*a* to desired height relative to objects such as typewriter 30 in FIG. 4.**

Connection of the tubular sockets 58, 59 to the underside of the receiver may be had as by the channel shaped bracket 70 attached to the receiver, and straddling the sockets. Locking bolts 71–73 attached to the bracket arms extend closely beneath the tubular sockets, as shown.

Referring again to the slide projector 44, it may alternatively be attached to the camera lens barrel to receive slides in the direct path of the camera optics, for viewing. A suitable light source may then be connected to illuminate the under side of the slides.

Referring to the video receiver in FIG. 1, it includes the usual control, and in addition it includes a polarity control 91. The latter is operable to reverse the polarity on the screen so that, for example, dark printing on a light background (as correspond to a book page) may be converted to light printing on a dark background. The latter is many times more easily read by partially blind persons, as glare is reduced.

We claim:

1. In apparatus for displaying a magnified image of an object, the combination comprising a. a video receiver, b. a video camera; the camera electrically connected with the receiver so that the receiver screen displays a magnified image of said object toward which the camera is directed below the level of the camera, c. first means carried by the receiver and supporting the camera at one side thereof, and d. second means supporting the receiver spaced above the object level, said second means connected with the receiver and being everywhere spaced outside of an object zone below camera level, said second means including legs having generally horizontal stretches and generally vertical stretches.

2. The combination of claim 1 wherein said first means includes an adapter package carried at the side of the receiver and connected with the camera, the package including a generally horizontal pivot about which the camera is adjustably swingable.

3. The combination of claim 2 wherein said adapter package includes adjustable structure for raising and lowering the camera relative to said receiver.

4. The combination of claim 2 including a light source carried to tilt with the camera and oriented to direct a light beam toward said object.

5. The combination of claim 4 wherein the light source is carried by the camera and has an adjustable connection for adjustably tilting the source relative to the camera.

6. In apparatus for displaying a magnified image of an object, the combination comprising a. a video receiver, b. a video camera having a lens barrel; the camera electrically connected with the receiver so that the receiver screen displays a magnified image of said object toward which the camera is directed below the level of the camera, c. first means carried by the receiver and supporting the camera for movement relative thereto at one side thereof, and d. second means supporting the receiver spaced above the object level, said second means connected with the receiver and being everywhere spaced outside of an ojbect zone below lens barrel level, said second means including tubular legs having generally horizontal stretches and generally vertical stretches.

7. The combination of claim 6 wherein said second means includes tubular sockets telescopically interfitting said generally horizontal stretches of the tubular legs.

8. The combination of claim 6 wherein the vertical stretches of the legs have vertically extensible sections for raising and lowering the receiver.

9. In apparatus for displaying a magnified image of an object, the combination comprising a. a video receiver, b. a video camera; the camera electrically connected with the receiver so that the receiver screen displays a magnified image of said object toward which the camera is directed below the level of the camera, c. first means carried by the receiver and supporting the camera for movement relative thereto at one side thereof, d. second means supporting the receiver spaced above the object level, said second means connected with the receiver and being everywhere spaced outside of an object zone below camera level, e. said first means including an adapter package carried at the side of the receiver and connected with the camera, the package including a generally horizontal pivot about which the camera is adjustably swingable.

f. a light source and a slide projector associated with the light source to direct illuminated images of photographic slides for viewing by the camera.

* * * * *